April 21, 1925.
K. MÜLLER
CUTTING TOOL
Filed Dec. 1, 1922
1,535,028
2 Sheets-Sheet 1
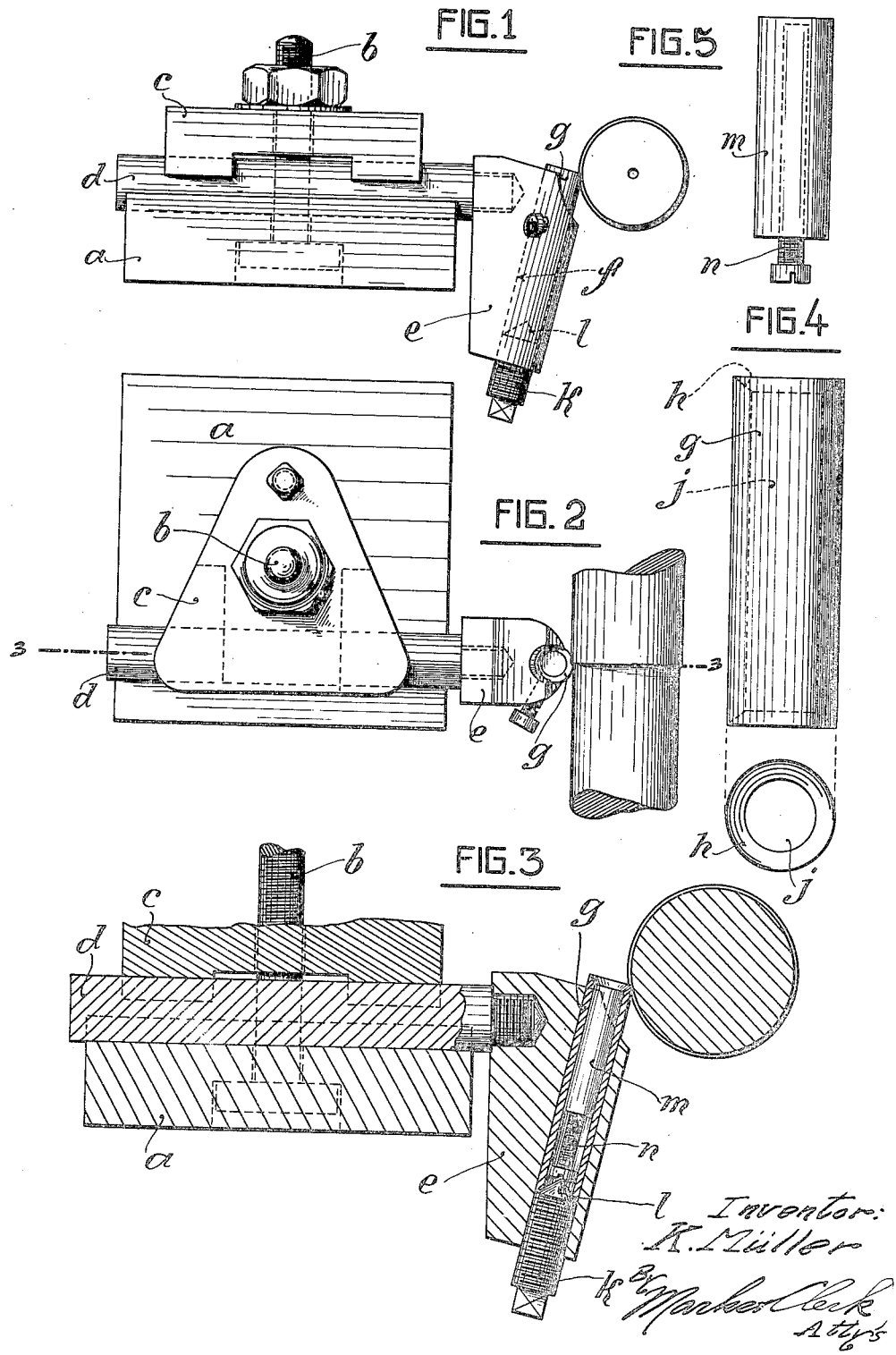

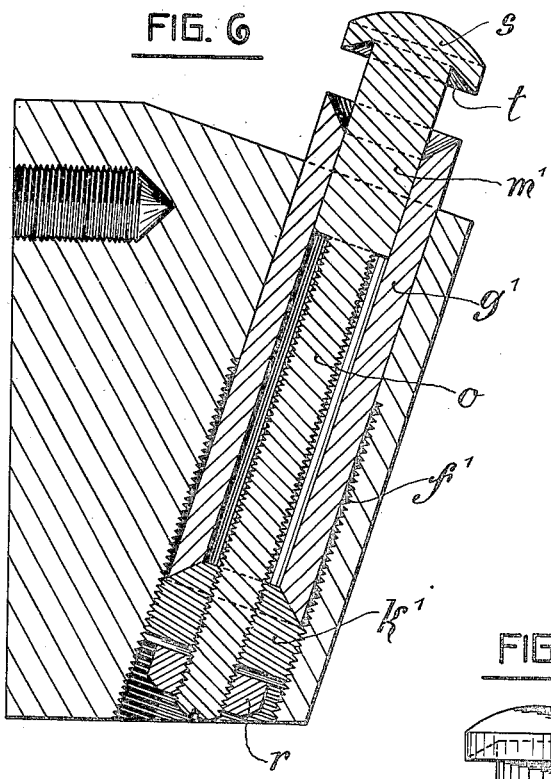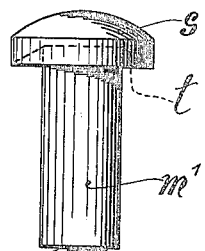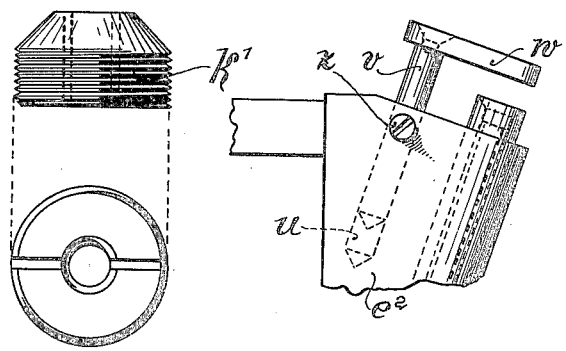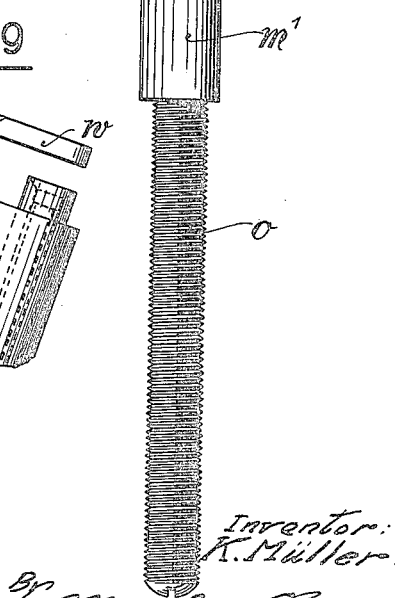

Patented Apr. 21, 1925.

1,535,028

UNITED STATES PATENT OFFICE.

KARL MÜLLER, OF KREIENSEN, GERMANY.

CUTTING TOOL.

Application filed December 1, 1922. Serial No. 604,406.

*To all whom it may concern:*

Be it known that I, KARL MÜLLER, a citizen of Germany, residing in Kreiensen, Harz, Am Brunstein 190, have invented new and useful Improvements in and Relating to Cutting Tools, of which the following is a specification.

My invention relates to improvements in cutting tools adapted for turning, planing, or any other metal work of a similar nature, and more particularly in tools of the class comprising a cylindrical cutting member having its cutting edge made by a conical depression ground in its end face or faces. The object of the improvements is to provide a tool of this type in which when grinding the conical depression or depressions the chips are readily removed so as not to injure the grinding member and the surface being ground, and which when used for cutting is not clogged by the shavings cut from the blank. With this object in view my invention consists in constructing the cutting member from a tubular member and a removable core adapted to fill the hollow of the member to a point near the cutting edge thereof. For grinding the cutting member the core is removed, so that the chips fall through the same and the surface being ground is always clean, and when using the tool the core fills out the hollow of the tubular member so that the member is not clogged by chips. Other objects of the improvements will appear from the following description.

For the purpose of explaining the invention several examples embodying the same are shown in the accompanying drawings, in which the same reference characters have been used in all the views to indicate corresponding parts. In the said drawings, Fig. 1, is an elevation showing the cutting member and its holder, Fig. 2, is a plan view of Fig. 1, Fig. 3, is a vertical section taken on the line III—III of Fig. 2, Fig. 4, is an elevation and a plan view showing the cutting member on an enlarged scale, Fig. 5, is an elevation showing the core, Fig. 6, is a sectional view showing a modification, Fig. 7, is an elevation showng the core provided in the cutting member shown in Fig. 6, Fig. 8, is an elevation and a plan view showing the nut providing a rear support for the cutting member shown in Fig. 6, and Fig. 9, is an elevation showing a modification.

Referring to the example shown in Figs. 1–5, the apparatus consists of a tool post or support $a$ adapted to be mounted on a lathe or other machine and having the shank $d$ of a tool holder clamped thereto by means of a plate $c$ and a screw $b$.

To the shank of the holder a head $e$ of circular or square cross-section is secured which projects downwardly from the shank and is formed with an inclined bore $f$ having the cutting member $g$ mounted therein. The cutting member is in the form of a tubular member of tempered steel and it is adapted to be locked within the bore in circumferential and longitudinal directions. For locking the cutting member in position a set screw is provided. At its top and bottom ends the cutting member is formed with conical depressions $h$ providing circular cutting edges and adapted to be reground in case of wear by a conical grinding disk.

The bore $f$ is internally screw-threaded at its bottom end and into the screw-threaded portion there screws a set screw $k$ which in the example shown in Figs. 1 to 5 is formed at its upper end with a conical point 11 corresponding to the conical portion of the cutting member $g$ and providing a longitudinally adjustable support for the cutting member. By screwing the screw $k$ more or less into the bore $f$ the reduction of the length of the cutting member by grinding is compensated. In the operation of the tool the cutting member is turned about its longitudinal axis at certain intervals of time so that successively all the parts of the circular cutting edge are brought into cutting position. In most cases such turning is effected by hand.

Within the bore $j$ of the cutting member $g$ there is a cylindrical core $m$ which is provided at its bottom end with a screw $n$ for setting the core with its upper end in the proper position relatively to the cutting edge. The screw $n$ bears with its bottom end on the point $l$ of the screw $k$.

For grinding the cutting member I place the same on the grinding machine after removing the cylindrical core $m$. When grinding the chips fall through the bore of the cutting member, so that they do not injure the grinding tool or the surface being ground. When using the cutting member for turning I fit the core into the same. This is an important feature of the invention, because when not filling out the hollow of the tubular cutting member the turnings will clog the hollow thereof, so that afterwards grinding is just as difficult as grinding of a solid cutting member of similar constructon. Furthermore, I am enabled to set the core with its top end different distances away from the cutting edge and thereby to break up the turnings into pieces of the desired length.

In the modification shown in Figs. 6 to 8 the core $m'$ is formed at its lower part with a screw-threaded shaft portion $o$ of reduced diameter, screwing in an axial bore of the nut $k'$. The nut $k'$ is slotted at its bottom face to accommodate a screw-driver. Therefore the axial dimension of the nut is small and it is perfectly sunk in the screw-threaded lower part of the bore $f'$. To fix the core $m$ in position a counter nut $r$ is screwed to the lower end of the shaft $o$.

As shown the core $m$ projects upwardly beyond the upper end of the cutting member $g'$ and it is formed at its top with a head $s$ by means of which it can be screwed more or less into the nut $k'$ for adjusting the same axially of the cutting member. Furthermore the said head provides a means for breaking up the turnings, for which purpose it is formed at its bottom face with a conical cavity $t$ directed so that the turnings strike the said face in perpendicular direction rather than angularly. I have found that with the face $t$ perpendicular to the axis of the cutting member the turnings are deflected outwardly without being broken up. By setting the head $s$ more or less away from the cutting edge the turnings are broken up into pieces of the desired length.

In Fig. 9 I have shown a further modification which is similar to the one described with reference to Figs. 6 to 8, in which however the head $s$ of the core $m'$ is omitted and the core ends a suitable distance below the cutting edge. In front of and above the cutting member an arm $w$ is provided which is fixed to a shank $v$ adjustably secured within a bore $u$ made within the head $e^2$ and parallel to the axis of the cutting member. The shank $v$ is fixed in position by means of a set screw $z$. By setting the arm $w$ a suitable distance away from the cutting edge the turnings are broken up into pieces of the desired length.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. A cutting tool, comprising an undivided tubular cutting member formed with a continuous circumferential cutting edge, in combination with a removable core within said tubular member.

2. A cutting tool, comprising an undivided tubular cutting member formed with a continuous circumferential cutting edge, in combination with a removable core axially adjustable within said tubular member.

3. In a cutting tool, the combination, with a holder having a cylindrical bore, of a tubular cutting member within said bore formed at its ends with conical depressions providing circumferential cutting edges, and a member screwed into said bore and formed with a conical end face in position for providing a support for said tubular cutting member.

4. In a cutting tool, the combination, with a holder having a cylindrical bore, of a tubular cutting member within said bore formed at its ends with conical depressions providing circumferential cutting edges, a core within said tubular cutting member and having a screw-threaded portion of reduced diameter, a member having a screw-threaded axial bore engaging the said portion of reduced diameter, and a nut screwed into said bore provided in the said holder, the said nut being formed with a conical face providing a support for said cutting member.

5. In a cutting tool, the combination, with a holder having a cylindrical bore, of a tubular cutting member within said bore formed at its ends with conical depressions providing circumferential cutting edges, a core within said tubular cutting member formed with a head in front of the cutting edge of said cutting member and having a screw-threaded portion of reduced diameter, a member having a screw-threaded axial bore engaging the said portion of reduced diameter, and a nut screwed into said bore provided in the said holder, the said nut being formed with a conical face providing a support for said cutting member.

6. In a cutting tool, the combination, with a holder having a cylindrical bore, of a tubular cutting member within said bore formed at its ends with conical depressions providing circumferential cutting edges, a core within said tubular cutting member formed with a head in front of the cutting edge of said cutting member and having a screw-threaded portion of reduced diameter, said head being formed at the side opposing the cutting edge with a conical depression, a member having a screw-threaded axial bore engaging the said portion of reduced diameter, and a nut screwed into said bore provided in the said holder, the said nut being formed with a conical face providing a support for said cutting member.

7. A cutting tool, comprising a holder, a tubular cutting member mounted therein and having a circumferential cutting edge, and a member in front of the cutting edge of said member in position for breaking up the turnings.

8. A cutting tool, comprising a holder, a tubular cutting member mounted therein, and a member in front of the cutting edge of said cutting member and capable of adjustment towards and away therefrom for breaking up the chips.

In testimony whereof I hereunto affix my signature in the presence of two witnesses.

KARL MÜLLER.

Witnesses:
E. HOLTZMANN,
EMIL KÖTTERITASCH.